US008517102B2

(12) United States Patent
Sullivan et al.

(10) Patent No.: US 8,517,102 B2
(45) Date of Patent: Aug. 27, 2013

(54) PROVISION OF VISCOUS COMPOSITIONS BELOW GROUND

(75) Inventors: Philip Sullivan, Bellaire, TX (US); Gary Tustin, Sawston (GB); Yenny Christanti, Houston, TX (US); Gregory Kubala, Houston, TX (US); Bruno Drochon, Cambridge (GB); Trevor Hughes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/738,853

(22) PCT Filed: Nov. 26, 2008

(86) PCT No.: PCT/US2008/084825
§ 371 (c)(1),
(2), (4) Date: May 23, 2013

(87) PCT Pub. No.: WO2009/070656
PCT Pub. Date: Jun. 4, 2009

(65) Prior Publication Data
US 2010/0276150 A1  Nov. 4, 2010

Related U.S. Application Data

(63) Continuation of application No. 11/944,681, filed on Nov. 26, 2007, now Pat. No. 7,703,527.

(51) Int. Cl.
*E21B 43/22* (2006.01)
(52) U.S. Cl.
USPC ......... 166/300; 166/279; 166/292; 166/305.1
(58) Field of Classification Search
None
See application file for complete search history.

(56) References Cited

U.S. PATENT DOCUMENTS

| 3,181,611 A | 5/1965 | Dollarhide |
| 3,181,612 A | 5/1965 | West et al. |

(Continued)

FOREIGN PATENT DOCUMENTS

| EP | 1347721 | 2/1974 |
| EP | 0116422 A1 | 8/1984 |

(Continued)

OTHER PUBLICATIONS

Albertsson: "Partition of cell particles and macromolecules, Third Edition: Separation and purification of biomolecules, cell organelles, membranes, and cells in aqueous polymer two-phase systems and their use in biochemical analysis and biotechnology," Wiley, New York, 1986, pp. 8-11.

(Continued)

*Primary Examiner* — Zakiya W Bates
(74) *Attorney, Agent, or Firm* — Rachel E. Greene; Jakub Michna; Bridget Laffey

(57) ABSTRACT

A thickened aqueous composition is delivered to a subterranean location accessible via a wellbore by steps of i. providing a biphasic aqueous mixture comprising two aqueous solutions which, at surface temperature and pressure, are able to co-exist as separate aqueous phases in contact with each other, ii. pumping said biphasic aqueous system down the wellbore to the subterranean location, and iii. converting the biphasic mixture below ground so that its phases combine into a single aqueous phase which is more viscous than the biphasic mixture. The two phases of the aqueous biphasic mixture contain dissolved solutes which segregate between the two phases such that at least one first solute is present at a greater concentration in the first aqueous phase than in the second aqueous phase while at least one second solute is present at a greater concentration in the second aqueous phase than in the first aqueous phase. The solute in the first phase may be a thickening polymer or other thickening material such as viscoelastic surfactant. The solute in the second phase may be a different polymer, surfactant or salt. Conversion to a single phase may be carried out in various ways including dilution, change in pH, change in salinity, increase in temperature and adsorption of one solute onto formation rock.

15 Claims, 4 Drawing Sheets

(56) References Cited

U.S. PATENT DOCUMENTS

| | | |
|---|---|---|
| 3,378,074 A | 4/1968 | Kiel |
| 3,383,307 A | 5/1968 | Goetz |
| 3,552,494 A | 1/1971 | Kiel |
| 3,629,101 A | 12/1971 | Hille et al. |
| 3,710,865 A | 1/1973 | Kiel |
| 3,734,873 A | 5/1973 | Anderson et al. |
| 3,739,848 A | 6/1973 | Lawson et al. |
| 3,885,628 A * | 5/1975 | Reed et al. ............... 166/252.1 |
| 3,908,760 A | 9/1975 | Clampitt et al. |
| 3,937,283 A | 2/1976 | Blauer et al. |
| 4,137,970 A | 2/1979 | Laflin et al. |
| 4,146,499 A | 3/1979 | Rosano |
| 4,154,674 A | 5/1979 | Warshawsky et al. |
| 4,336,145 A | 6/1982 | Briscoe |
| 4,425,241 A | 1/1984 | Swanson |
| 4,440,228 A | 4/1984 | Swanson |
| 4,442,892 A | 4/1984 | Delesandri |
| 4,442,897 A | 4/1984 | Crowell |
| 4,485,020 A | 11/1984 | Shay et al. |
| 4,495,772 A | 1/1985 | Furuta et al. |
| 4,510,998 A | 4/1985 | Peiffer |
| 4,522,953 A | 6/1985 | Barby et al. |
| 4,675,101 A | 6/1987 | Warzinski |
| 4,725,372 A * | 2/1988 | Teot et al. ............... 507/129 |
| 4,733,729 A | 3/1988 | Copeland |
| 4,765,834 A | 8/1988 | Ananthapadmanabhan et al. |
| 4,795,772 A | 1/1989 | Hsieh |
| 4,844,163 A | 7/1989 | Hazlett et al. |
| 4,913,231 A | 4/1990 | Muller et al. |
| 4,986,354 A | 1/1991 | Cantu et al. |
| 5,110,486 A | 5/1992 | Manalastas et al. |
| 5,169,559 A | 12/1992 | Naae et al. |
| 5,190,374 A | 3/1993 | Harms et al. |
| 5,246,137 A | 9/1993 | Schutz et al. |
| 5,247,995 A | 9/1993 | Tjon-Joe-Pin et al. |
| 5,382,411 A | 1/1995 | Allen |
| 5,382,481 A | 1/1995 | Fleischer |
| 5,426,137 A | 6/1995 | Allen |
| 5,633,220 A | 5/1997 | Cawiezel et al. |
| 5,663,123 A | 9/1997 | Goodhue, Jr. et al. |
| 5,765,642 A | 6/1998 | Surjaatmadja |
| 5,785,979 A | 7/1998 | Wells |
| 5,892,147 A | 4/1999 | Garnes et al. |
| 5,922,652 A | 7/1999 | Kowalski et al. |
| 5,922,664 A | 7/1999 | Cao et al. |
| 5,948,263 A | 9/1999 | Chaiko et al. |
| 6,011,075 A | 1/2000 | Parris et al. |
| 6,017,855 A | 1/2000 | Dawson et al. |
| 6,169,058 B1 | 1/2001 | Le et al. |
| 6,180,587 B1 | 1/2001 | Fuller et al. |
| 6,291,406 B1 | 9/2001 | Rose et al. |
| 6,383,990 B1 | 5/2002 | Dawson et al. |
| 6,429,177 B1 | 8/2002 | Williams et al. |
| 6,433,075 B1 | 8/2002 | Davies et al. |
| 6,443,001 B1 | 9/2002 | Duriez et al. |
| 6,450,260 B1 | 9/2002 | James et al. |
| 6,489,270 B1 | 12/2002 | Vollmer et al. |
| 6,613,720 B1 | 9/2003 | Feraud et al. |
| 6,645,769 B2 | 11/2003 | Tayebi et al. |
| 6,727,209 B2 | 4/2004 | Pereira et al. |
| 6,733,769 B1 | 5/2004 | Ryan et al. |
| 6,787,511 B2 | 9/2004 | Patel et al. |
| 6,805,879 B2 | 10/2004 | Jin et al. |
| 6,810,959 B1 | 11/2004 | Qu et al. |
| 6,818,594 B1 | 11/2004 | Freeman et al. |
| 6,818,597 B2 | 11/2004 | Harris |
| 6,818,599 B2 | 11/2004 | Gonzalez et al. |
| 6,838,418 B2 | 1/2005 | Allan et al. |
| 6,843,841 B2 | 1/2005 | Reddy et al. |
| 6,987,083 B2 | 1/2006 | Phillippi et al. |
| 6,998,393 B2 | 2/2006 | Jin et al. |
| 7,004,254 B1 | 2/2006 | Chatterji et al. |
| 7,032,662 B2 | 4/2006 | Malone et al. |
| 7,048,432 B2 | 5/2006 | Phillippi et al. |
| 7,081,439 B2 | 7/2006 | Sullivan et al. |
| 7,090,015 B2 | 8/2006 | Todd |
| 7,096,954 B2 | 8/2006 | Weng et al. |
| 7,117,942 B2 | 10/2006 | Dalrymple et al. |
| 7,129,201 B2 | 10/2006 | Yang et al. |
| 7,151,078 B2 | 12/2006 | Zaroslov et al. |
| 7,195,065 B2 | 3/2007 | Kelly et al. |
| 7,207,387 B2 | 4/2007 | Eoff et al. |
| 7,220,713 B2 | 5/2007 | Patel et al. |
| 7,270,184 B2 | 9/2007 | Kotlar et al. |
| 7,273,840 B2 | 9/2007 | Patel et al. |
| 7,287,587 B2 | 10/2007 | Reddy et al. |
| 7,287,588 B2 | 10/2007 | Zaroslov et al. |
| 7,290,615 B2 | 11/2007 | Christanti et al. |
| 7,311,146 B1 | 12/2007 | Hanes, Jr. et al. |
| 7,316,275 B2 | 1/2008 | Wang et al. |
| 7,322,414 B2 | 1/2008 | Reddy et al. |
| 7,338,924 B2 | 3/2008 | Varadaraj |
| 7,347,260 B2 | 3/2008 | Ferguson et al. |
| 7,351,681 B2 | 4/2008 | Reddy et al. |
| 7,703,521 B2 | 4/2010 | Sullivan et al. |
| 7,703,527 B2 | 4/2010 | Sullivan et al. |
| 7,950,459 B2 | 5/2011 | Sullivan et al. |
| 8,043,999 B2 | 10/2011 | Sullivan et al. |
| 8,044,000 B2 | 10/2011 | Sullivan et al. |
| 2001/0018792 A1 | 9/2001 | Miyahara |
| 2002/0017492 A1 | 2/2002 | Jensen et al. |
| 2002/0055461 A1 | 5/2002 | Jin et al. |
| 2003/0026995 A1 | 2/2003 | Duchesne et al. |
| 2003/0029615 A1 | 2/2003 | Maberry et al. |
| 2003/0032562 A1 | 2/2003 | Crossman et al. |
| 2003/0121701 A1 * | 7/2003 | Polizzotti et al. ............... 175/17 |
| 2004/0034145 A1 | 2/2004 | Fischer et al. |
| 2004/0054076 A1 | 3/2004 | Lannibois-Drean et al. |
| 2004/0072698 A1 | 4/2004 | Zaroslov et al. |
| 2004/0209780 A1 | 10/2004 | Harris et al. |
| 2004/0256106 A1 | 12/2004 | Phillippi et al. |
| 2005/0037928 A1 | 2/2005 | Qu et al. |
| 2005/0107053 A1 | 5/2005 | De Courville et al. |
| 2005/0107265 A1 | 5/2005 | Sullivan et al. |
| 2005/0107503 A1 | 5/2005 | Couillet et al. |
| 2005/0115710 A1 | 6/2005 | Kotlar et al. |
| 2005/0155796 A1 | 7/2005 | Eoff et al. |
| 2005/0178546 A1 | 8/2005 | Reddy et al. |
| 2005/0199396 A1 | 9/2005 | Sierra et al. |
| 2005/0202978 A1 | 9/2005 | Shumway |
| 2005/0272612 A1 | 12/2005 | Dawson et al. |
| 2006/0054324 A1 | 3/2006 | Sullivan et al. |
| 2006/0140897 A1 | 6/2006 | Patel et al. |
| 2006/0144588 A1 | 7/2006 | Ferguson et al. |
| 2006/0166835 A1 | 7/2006 | Yang et al. |
| 2006/0166837 A1 | 7/2006 | Lin et al. |
| 2006/0166838 A1 | 7/2006 | Collins et al. |
| 2006/0219406 A1 | 10/2006 | Boney et al. |
| 2006/0234871 A1 | 10/2006 | Dalrymple et al. |
| 2006/0234874 A1 | 10/2006 | Eoff et al. |
| 2006/0234897 A1 | 10/2006 | Patel et al. |
| 2006/0258542 A1 | 11/2006 | Segura |
| 2006/0275919 A1 | 12/2006 | Lindhardt et al. |
| 2006/0289158 A1 | 12/2006 | Reddy et al. |
| 2006/0289160 A1 | 12/2006 | van Batenburg et al. |
| 2007/0004496 A1 | 1/2007 | Gordon et al. |
| 2007/0102156 A1 | 5/2007 | Nguyen et al. |
| 2007/0114035 A1 | 5/2007 | Parris et al. |
| 2008/0081771 A1 | 4/2008 | Lin et al. |
| 2008/0096774 A1 | 4/2008 | Tabary et al. |
| 2008/0121395 A1 | 5/2008 | Reddy et al. |
| 2009/0023614 A1 | 1/2009 | Sullivan et al. |
| 2009/0023615 A1 | 1/2009 | Chen et al. |
| 2009/0133868 A1 | 5/2009 | Sullivan et al. |
| 2009/0163387 A1 | 6/2009 | Sullivan et al. |
| 2009/0205824 A1 | 8/2009 | Sullivan et al. |
| 2009/0205829 A1 | 8/2009 | Sullivan et al. |
| 2010/0175881 A1 | 7/2010 | Sullivan et al. |
| 2010/0179076 A1 | 7/2010 | Sullivan et al. |
| 2010/0184630 A1 | 7/2010 | Sullivan et al. |
| 2010/0184631 A1 | 7/2010 | Turner et al. |
| 2010/0276150 A1 | 11/2010 | Sullivan et al. |
| 2011/0303408 A1 | 12/2011 | Hartshorne et al. |

FOREIGN PATENT DOCUMENTS

| | | |
|---|---|---|
| EP | 60138 B1 | 9/1986 |
| EP | 0358385 A2 | 3/1990 |
| EP | 0583814 A1 | 2/1994 |
| EP | 0797925 A1 | 10/1997 |
| EP | 0846747 A1 | 10/1998 |
| EP | 1207267 A1 | 5/2002 |
| GB | 1347721 | 2/1974 |
| GB | 2070028 | 9/1981 |
| GB | 2172008 A | 9/1986 |
| JP | 61225275 A | 10/1986 |
| JP | 61225276 A | 10/1986 |
| WO | 9207919 A1 | 5/1992 |
| WO | 9322537 A1 | 11/1993 |
| WO | 9856868 A1 | 12/1998 |
| WO | 0138695 A2 | 5/2001 |
| WO | 03056130 | 7/2003 |
| WO | 03106809 | 12/2003 |
| WO | 2005018773 | 3/2005 |
| WO | 2006024795 A2 | 3/2006 |
| WO | 2007089154 A1 | 8/2007 |
| WO | 2007132137 A1 | 11/2007 |
| WO | 2009010932 A2 | 1/2009 |
| WO | 2009069057 | 6/2009 |
| WO | 2010084376 | 7/2010 |

OTHER PUBLICATIONS

Babak et al: "Highly concentrated emulsions: Physicochemical principles of formulation," Journal of Dispersion Science and Technology, vol. 23, No. 1, 2002, pp. 1-22.

Cameron et al: "High internal phase emulsions (HIPEs)—Structure, properties and use in polymer preparation," Advances in Polymer Science, vol. 126, 1996, pp. 163-214.

Chen et al: "Effect of the nature of the hydrophobic oil phase and surfactant in the formation of concentrated emulsions," Journal of Colloid and Interface Science, vol. 145, No. 1, 1991, pp. 260-269.

Kakadjian et al: "Crosslinked emulsions to be used as fracturing fluids," SPE 65038, SPE International Symposium on Oilfield Chemistry, Houston, Texas, Feb. 13-16, 2001.

Kelker et al: "Development of an oil-based gravel-pack carrier fluid," SPE 64978, SPE International Symposium on Oilfield Chemistry, Houston, Texas, Feb. 13-16, 2001.

Kizling et al: "On the formation and stability of high internal phase 0/W.emulsions," Advances in Colloid and Interface Science, vols. 123-126, 2006, pp. 295-302.

Pal: "Yield stress and viscoelastic properties of high internal phase ratio emulsions," Colloid and Polymer Science, vol. 277, 1999, pp. 583-588.

Pal: "Rheology of high internal phase ratio emulsions," Food Hydrocolloids, vol. 20, 2006, pp. 997-1005.

Princen: "Rheology of foams and highly concentrated emulsions : I. Elastic properties and yield stress of a cylindrical model system," Journal of Colloid and Interface Science, vol. 91, No. 1, 1983, pp. 160-175.

Princen et al: "Rheology of foams and highly concentrated emulsions : Ill. Static shear modulus," Journal of Colloid and Interface Science, vol. 112, No. 2, 1986, pp. 427-437.

Princen et al: "Rheology of foams and highly concentrated emulsions : IV. An experimental study of the shear viscosity and yield stress of concentrated emulsions," Journal of Colloid and Interface Science, vol. 128, No. 1, 1989, pp. 176-187.

Romero et al: "Plugging of High Permeability-Fractured Zones Using Emulsions," SPE/DOE 35461, SPE/DOE Tenth Symposium on Improved Oil Recovery, Tulsa, Oklahoma, Apr. 21-24, 1996.

Roodhart et al: "Polymer Emulsion: The revival of a fracturing fluid," SPE/DOE 16413, SPE/DOE Low Permeability Symposium, Denver, Colorado, May 18-19, 1987.

Ruckenstein: "Concentrated emulsion polymerization," Advances in polymer science, vol. 127, 1997, pp. 1-58.

Sangster: "Octanol-water partition coefficients: Fundamentals and physical chemistry," Wiley Series in Solution Chemistry, vol. 2, 1997, pp. 1-55 and 157-167.

Solans et al: "Highly concentrated (gel) emulsions, versatile reaction media," Current Opinion in Colloid & Interface Science, vol. 8, 2003, pp. 156-163.

Akama et al: "Extraction mechanism of Cr(VI) on the aqueous two-phase system of tetrabutylammonium bromide and (NH4)2SO4 mixture", Talanta, vol. 57, 2002, pp. 681-686.

Ananthapadmanabhan et al: "Aqueous biphase formation in polyethylene oxide-inorganic salt systems", Langmuir, vol. 3, 1987, pp. 25-31.

Bergfeldt et al: "Phase behavior of weakly charged polymer/surfactant/water mixtures", Journal of Physical Chemistry, vol. 100, 1996, pp. 5935-5940.

Capron et al: "Water in water emulsions: phase separation and rheology of biopolymer solutions", Rheol. Acta, vol. 40, 2001, pp. 441-456.

Carlsson et al: "Thermal gelation of nonionic cellulose ethers and ionic surfactants in water", Colloids and Surfaces, vol. 47, 1990, pp. 147-165.

Chen et al: "Polyethylene glycol and solutions of polyethylene glycol as green reaction media", Green Chemistry, vol. 7, 2005, pp. 64-82.

East Jr. et al: "Hydrajet perforating and proppant plug diversion in multi-interval horizontal well fracture stimulation: case histories", SPE Tight Gas Completions Conference, San Antonio, Texas, USA, Jun. 9-11, 2008, SPE 114881.

Fernandes et al: "Electrochemically induced deposition of a polysaccharide hydrogel onto a patterned surface", Langmuir, vol. 19, 2003, pp. 4058-4062.

Hellebust et al: "Associative and segregative phase behaviour of a mixed aqueous cationic surfactant and anionic hydrophilic polymer system", Colloids and Surfaces A: Physicochemical and Engineering Aspects, vol. 243, 2004, pp. 133-138.

Hellebust et al: "Phase behavior of anionic polyelectrolyte mixtures in aqueous solution. Effects of molecular weights, polymer charge density, and ionic strength of solution", Macromolecules, vol. 36, 2003, pp. 5372-5382.

Hexion Speciality Chemicals: "Versatic derivatives. Cardura/VeoVa/ACE monomers", Product bulletin. Date of publication not known: http://products.brenntagspecialties.com/hexion/Cardura_VeoVa_ACE_Monomers.pdf.

Huddleston et al: "Metal ion separations in aqueous biphasic systems and using aqueous biphasic extraction chromatography", Metal-Ion Separation and Preconcentration. Progress and Opportunities. Bond, Dietz and Rogers editors, American Chemical Society, Washington DC, ACS Symposium Series 716, 1999, pp. 79-100.

Huddleston et al: "Phase diagram data for several PEG + salt aqueous biphasic systems at 25° C.", Journal of Chemical & Engineering Data, vol. 48, 2003, pp. 1230-1236.

Huddleston et al: "Aqueous polymeric solutions as environmentally benign liquid/liquid extraction media", Industrial & Engineering Chemistry Research, vol. 38, 1999, pp. 2523-2539.

Jiang et al: "Some applications and developments of isotope tracer and radiation technology in Chinese oil field monitoring", Journal of Radioanalytical and Nuclear Chemistry, Articles, vol. 205, No. 2, 1996, pp. 215-223.

Kepka et al: "Extraction of plasmid DNA from *Escherichia coli* cell lysate in a thermoseparating aqueous two-phase system", Journal of Chromatography A, vol. 1024, 2004, pp. 95-104.

Kessel: "Some determinants of partitioning behavior of lymphoblasts in aqueous biphasic systems", Biochimica et Biophysica Acta, vol. 678, 1981, pp. 245-249.

Kopperschläger et al: "Affinity partitioning and extraction of proteins", Bioseparation, vol. 1, 1990, pp. 235-254.

Mandala et al: "Phase and rheological behaviors of xanthan/amylose and xanthan/starch mixed systems", Carbohydrate Polymers, vol. 58, 2004, pp. 285-292.

McDaniel et al: "A new environmentally acceptable technique for determination of propped fracture height and width", 2007 SPE Annual Technical Conference and Exhibition, Anaheim, California, Nov. 11-14, 2007, SPE 109969.

Oblonsek et al: "Rheological studies of concentrated guar gum", Rheologica Acta, vol. 42, 2003, pp. 491-499.

Olsson et al: "Particle-induced phase separation in mixed polymer solutions", Langmuir, vol. 21, 2005, pp. 1560-1567.

Rodriguez et al: "Physicochemical characterization of the PEG8000-Na2SO4 aqueous two-phase system", Industrial & Engineering Chemistry Research, vol. 46, 2007, pp. 8199-8204.

Rogers et al: "Partitioning of small organic molecules in aqueous biphasic systems", Journal of Chromatography B, vol. 711, 1998, pp. 255-263.

Rogers et al: "Metal ion separations in polyethylene glycol-based aqueous biphasic systems", Separation Science and Technology, vol. 28(5), 1993, pp. 1091-1126.

Rogers et al: "New technologies for metal ion separations. Polyethylene glycol-based aqueous biphasic systems and aqueous biphasic extraction chromatography", Ion Exchange and Solvent Extraction, vol. 13, Marinsky and Marcus editors, Marcel Dekker, New York 1997, chapter 4, pp. 141-193.

Sarubbo et al: "Partition of proteins in aqueous two-phase systems based on cashew-nut tree gum and poly (ethylene glycol)", Brazilian archives of Biology and Technology, vol. 47, No. 5, 2004, pp. 685-691.

Stavland et al: "How to apply a blocking gel system for bullhead selective water shutoff: from laboratory to field", 2006 SPE/DOE Symposium on Improved Oil Recovery, Tulsa, Oklahoma, USA, Apr. 22-26, 2006, SPE 99729.

Taylor: "Rheology of hydrophobically associating polymers for oilfield applications", Annual Transactions of the Nordic Rheological Society, vol. 11, 2003.

Tolstoguzov: "Some thermodynamic considerations in food formulation", Food Hydrocolloids, vol. 17, 2003, pp. 1-23.

Tolstoguzov: "Texturising by phase separation", Biotechnology Advances, vol. 24, 2006, pp. 626-628.

Walter et al: "Hydrophobic affinity partition in aqueous two-phase systems containing poly(ethylene glycol)-palmitate of rightside-out and inside-out vesicles from human erythrocyte membranes", FEBS Letters, vol. 61, No. 2, Jan. 1976.

Whitcomb et al: "Rheology of guar solutions", Journal of Applied Polymer Science, vol. 25, 1980, pp. 2815-2827.

Willauer et al: "Solute partitioning in aqueous biphasic systems composed of polyethylene glycol and salt: the partitioning of small neutral organic species", Industrial & Engineering Chemistry Research, vol. 41, 2002, pp. 1892-1904.

Willauer et al: "Solvent properties of aqueous biphasic systems composed of polyethylene glycol and salt characterized by the free energy of transfer of a methylene group between the phases and by a linear solvation energy relationship", Industrial & Engineering Chemistry Research, vol. 41, 2002, pp. 2591-2601.

Willauer et al: "Partitioning of aromatic molecules in aqueous biphasic systems", Separation Science and Technology, vol. 34(6 &7), 1999, pp. 1069-1090.

Willauer et al: "Investigation of aqueous biphasic systems for the separation of lignins from cellulose in the paper pulping process", Journal of Chromatography 8, vol. 743, 2000, pp. 127-135.

Zhang et al: "Aqueous polysaccharide blends based on hydroxypropyl guar gum and carboxymethyl cellulose: synergistic viscosity and thixotropic properties", Colloid and Polymer Science, vol. 285, 2006, pp. 145-151.

Zhang et al: "Synergistic viscosity characteristics of aqueous mixed solutions of hydroxypropyl- and carboxymethyl hydroxypropyl-substituted guar gums", Colloids and Surfaces A: Physiochemical and Engineering Aspects, vol. 279, 2006, pp. 34-39.

Closs et al: "Phase separation and rheology of aqueous starch/galactomannan systems"; Carbohydrate Polymers 39 (1999) 67-77.

Combined Search and Exam Report of British Application No. GB0900970.5 (57.0877GB) dated May 21, 2009: pp. 1-5.

Search Report of Eurasian Application No. 201070658 (57.0885EA) dated Nov. 19, 2010: p. 1.

Bird et al., "Part I: Newtonian Versus Non-Newtonian Behavior," and "Chapter 2: Flow Phenomena in Polymeric Liquids," Dynamics of Polymeric Liquids, vol. 1 Fluid Mechanics, Second Edition, John Wiley & Sons: New York, 1987: pp. 1-2 and 55-61.

Tolstoguzov, "Chapter 17: Phase Behavior in Mixed Polysaccharide Systems," Food Polysaccharides and Their Applications, Second Edition, eds.: Stephen et al., 2006: pp. 589-627.

International Search Report and Written Opinion of PCT Application No. PCT/US2008/084825 dated May 7, 2013: pp. 1-12.

* cited by examiner

PROVISION OF VISCOUS COMPOSITIONS BELOW GROUND

FIELD OF THE INVENTION

This invention relates to the provision of a thickened aqueous fluid or gel at a subterranean location. That location may be within a subterranean hydrocarbon reservoir and the aqueous fluid may play a role in reservoir management and/or hydrocarbon production.

BACKGROUND OF THE INVENTION

There are numerous circumstances in connection with the completion of wells and/or the production of hydrocarbons, i.e. oil or gas in which it is desired to place a thickened aqueous composition, that is to say a fluid or gel which is more viscous than water, at a location in a subterranean wellbore or in a subterranean geological formation.

Such viscosified fluids may be used for a variety of purposes including for example fracturing to stimulate production, reducing permeability where it is not required, zonal isolation and fluid drive from an injection well towards a production well.

The literature contains many proposals for the formulation and also for the placing of such thickened compositions. The viscosity required for a thickened composition will vary according to its intended function, and so for example fluids for zonal isolation may be very viscous gels intended to remain immobile whereas fluids for other functions may be required to be somewhat less viscous so that they can be moved by pump pressure. Nevertheless, there are obstacles to overcome. Pumping a viscous composition from surface to a subterranean location requires a great deal of energy and limits the viscosity of the composition which can be delivered downhole. Even formulating a very viscous composition at the surface is difficult. Methods for increasing viscosity when the composition is already underground have been proposed, but may involve cost or hazard associated with chemicals used and maybe applicable in only a limited range of circumstances.

SUMMARY OF THE INVENTION

The present invention provides a novel method of placing a viscous composition at an underground location. Objectives of certain embodiments of the invention include reduction in pumping energy required, and ability to deliver significant viscosity underground. The compositions used in the invention have the advantage of being water-based and the solutes in them can be chemically benign, both of which features are advantageous in mitigating the environmental impact from any accidental spillage or leakage.

Because the invention provides a novel technology for delivering a viscous composition to a subterranean location, embodiments of the invention may provide novel functionality or may provide improvements in performance over existing methods.

Broadly the present invention proposes formulating a reservoir fluid as an aqueous biphasic composition consisting of two aqueous solutions which, when mixed together, remain as separate phases rather than becoming a single phase. This composition is pumped, via a wellbore to a subterranean location. It is converted underground so that the two phases combine to form a single phase which is more viscous than the biphasic aqueous composition.

Aqueous systems which consist of two aqueous phases that remain as distinct phases even when placed in direct contact with each other have been known for a number of years. Such systems have been referred to as aqueous biphasic systems and have also been referred to as water-in-water emulsions when one phase is dispersed as droplets within the other. They have been used in some unrelated areas of technology, notably to give texture to foodstuffs, for extraction of biological materials and for the extraction of minerals.

The two phases of an aqueous biphasic composition contain dissolved solutes which are sufficiently incompatible that they cause segregation into two phases. One solute (or one mixture of solutes) is relatively concentrated in one phase and another solute (or mixture of solutes) is relatively concentrated in the other phase. More specifically, one phase may be relatively rich in one solute which is a polymer while the other phase is relatively rich in a solute which is a different polymer (a polymer/polymer system). Other possibilities are polymer/surfactant, polymer/salt, and surfactant/salt. An aqueous biphasic system can also be made with one salt concentrated in one phase and a different salt concentrated the other phase but these are less likely to provide the thickening called for in this invention.

Changes to the composition of an aqueous biphasic system, or to prevailing conditions such as pH, can convert the system from two phases to a single phase. We have found that an aqueous biphasic system can provide a mobile two-phase fluid of fairly low viscosity, which becomes more viscous on conversion to a single phase. In this invention that change to the more viscous single phase state is brought about underground so that the required viscosity can be provided at a subterranean location yet the fluid can be pumped towards that location as a mobile fluid thus enabling a reduction in the energy required to pump the fluid.

An aqueous biphasic mixture used in this invention should consist of two phases under surface conditions, which may conveniently be defined as 25° C. and 1000 mbar pressure. A biphasic composition used in this invention may comprise a rheology modifying material, more specifically a thickening material which is able to provide an increase in viscosity when added to water. This thickening material will be present at a greater concentration in a first phase of the biphasic system than in its second phase, while a second solute or mixture of solutes will be more concentrated in the second phase than in the first phase.

This second solute (or mixture of solutes) may, for convenience, be referred to as a 'second partitioning material' because its presence in addition to the thickening material causes segregation and the formation of the separate phases.

The presence of this second partitioning material and consequent formation of two phases with thickening material preferentially concentrated in one phase can, provided the volume of the second phase is sufficient, have the effect of preventing the thickening material from increasing the apparent viscosity of the mixture to the extent which would be observed in a single aqueous phase. The second partitioning material may have the effect of restricting the water solubility of the thickening material.

The aqueous biphasic mixture may form a water-in-water emulsion in which the phase in which the thickening agent is concentrated is the dispersed phase while the second phase, richer in the second partitioning material, is the continuous phase. Such a water-in-water emulsion behaves rheologically like a slurry of particles in the continuous phase. The apparent viscosity of the emulsion is then influenced primarily by the viscosity of the continuous phase and not much at all by the viscosity of the dispersed phase.

In order that the aqueous biphasic composition is mobile, it is likely that the dispersed phase rich in the thickening material will be not more than 70% of the total volume, possibly not more than 60 or 65% by volume of the total biphasic composition. The ratio by volume of the first phase (rich in the thickening material) to the second phase (rich in second partitioning material) may lie in a range from 70:30 or 60:40 to 40:60 or possibly to 35:65. A volume of second phase greater than 60 or 65% of the total volume is possible but then there would be an unnecessarily low proportion of thickening material in the overall mixture.

In order to form a mobile water-in-water emulsion with the thickening material concentrated in the dispersed phase, the weight ratio of thickening material to second partitioning material may lie in a range from 2:1 to 2:3. The upper limit on the proportion of thickening material may be somewhat lower, such as a 3:2 weight ratio. The other end of the range may be a somewhat larger proportion of thickening material, such as a 45:55 weight ratio of thickening material to second partitioning material.

The overall concentration of thickening material in an aqueous biphasic mixture can be high, possibly 15% or 20% by weight or more. However, in mixtures which will be converted underground to a single phase in accordance with this invention, the concentration of thickening material in the whole aqueous biphasic mixture is likely to range from 0.5% or 1% by weight up to 6% or 4% by weight.

The concentration of thickening material in the overall aqueous biphasic composition may be defined by reference to the viscosity of a single aqueous phase containing the same concentration of the same thickening material. Generally it will be a concentration such that a single phase aqueous solution containing the same concentration of thickening material would have a viscosity of at least 100 centipoise (0.1 Pascal.sec) at a low shear rate of 10 sec−1 at 25° C.

When it is desired to form an immobile stiff gel for zonal isolation, the concentration of thickening material in the overall aqueous biphasic composition may be such that a single phase aqueous solution containing the same concentration of thickening material would have a viscosity of at least 1000 centipoise (1 Pascal.sec) at a low shear rate of 10 sec−1 at 25° C.

It is likely that conversion from a biphasic mixture to a combined single phase will increase viscosity at least 10 times, possibly at least 50 times.

The solute (or mixture of solutes) which provides the second partitioning material does not need to have thickening properties, although it may do so. One possibility is that a second partitioning material is a material which does not cause an increase in viscosity when added to water, or does so only slightly (for instance many saline solutions are a little more viscous than pure water).

However, it is within the scope of this invention that the aqueous biphasic mixture comprises two materials which both have significant ability to viscosify water. One material concentrates in one phase, the other material in the second phase. On conversion to a single phase, both materials make a contribution to the overall viscosity of that single phase composition. The two materials may be used at concentrations which have very different thickening effects. One of them is present as a thickening material and is concentrated in the phase which is the dispersed phase of a water-in-water emulsion. The other of them is concentrated in the phase which forms the continuous phase of a water-in-water emulsion, but its concentration is sufficiently low that this continuous phase (and hence the water-in-water emulsion) remains mobile. On conversion to a single phase, it is the thickening material in the first phase which is primarily responsible for the increased viscosity.

Thickening material which is present primarily in the dispersed phase of a water-in-water emulsion may be a thickening polymer or a thickening viscoelastic surfactant. It is possible that a plurality of thickening materials which are compatible and all concentrate in the same phase of an aqueous biphasic system might be used in combination as thickening material concentrating in one phase.

Other solute which is the second partitioning material may be a polymer, surfactant or salt. It is possible that a plurality of materials which concentrate in the same phase may be used together as the second partitioning material, for example a plurality of salts or a combination of a polymer and a salt.

A thickening polymer may be one that is already known for thickening single phase compositions, for example a thickening polysaccharide such as guar, other galactomannans, xanthan, diutan, scleroglutan and cellulose. A thickening polymer may be a polysaccharide which has been chemically modified such as by introduction of hydroxyalkyl, carboxymethyl carboxymethylhydroxyalkyl or polyoxyalkylene side chains. Examples of useful hydroxyalkyl galactomannan polymers include, but are not limited to, hydroxy C1 to C4-alkyl galactomannans, such as hydroxy C1-C4-alkyl guars. Preferred examples of such hydroxyalkyl guars include hydroxyethyl guar (HE guar), hydroxypropyl guar (HP guar), and hydroxybutyl guar (HB guar), and hydroxyalkyl guars of mixed alkyl chain length. Other substituted polysaccharides include carboxymethyl guar (CMG), carboxymethylhydroxypropyl guar (CMHPG) and carboxymethylhydroxyethylcellulose (CMHEC).

The thickening material may be used in linear form or may be crosslinked. Crosslinking leads to a considerable increase in viscosity. Borate crosslinkers include boric acid, sodium tetraborate, and encapsulated borates; borate crosslinkers may be used with buffers and pH control agents such as sodium hydroxide, magnesium oxide, sodium sesquicarbonate, sodium carbonate, amines such as hydroxyalkyl amines, anilines, pyridines, pyrimidines, quinolines, and pyrrolidines, and carboxylates such as acetates and oxalates. Zirconium crosslinkers include zirconium lactates and complexes of zirconium with triethanolamine or 2,2'-iminodiethanol. Titanium-based crosslinkers include lactates and complexes with triethanolamine.

Another possibility is that the thickening polymer is synthetic, such as a polymer or copolymer of acrylamide, methacrylamide, acrylic acid or methacrylic acid. Acrylic acid-acrylamide copolymers, acrylic acid-methacrylamide copolymers, partially hydrolyzed polyacrylamides and partially hydrolyzed polymethacrylamides may be used, Synthetic polymers can be crosslinked by the incorporation of crosslinking agents such as divinylbenzene during the polymerisation.

Other solutes, present as second partitioning materials to make an aqueous biphasic system may, as has already been indicated, be polymers. Polymers which may be used for this purpose include polyethylene glycol of various molecular weights, polyvinyl alcohol and various substituted cellulosic polymers including alkyl substituted cellulose and hydroxy alkyl substituted cellulose. These polymers are available in various molecular weights. It is generally the case that a high molecular weight polymer is more effective to cause segregation into two aqueous phases than the same polymer with a lower molecular weight so that a smaller weight percentage of high molecular weight polymer may be sufficient. Solutes present as partitioning agents may be surfactants, notably non-ionic surfactants such as polyoxyethylene derivatives of C8 to C24 alcohols, (typically containing 10 to 30 ethylene oxide residues) and polyoxyethylene-polyoxypropylene block copolymers.

The solvent in a biphasic aqueous mixture is of course water. It may have some salts in it in addition to the first and second solutes (notably thickening material and second partitioning material) which segregate into the two phases. For instance a mixture containing a thickening polymer and a polymer as second partitioning material might have some salt(s) dissolved in the water to increase salinity or regulate the pH of the composition. Some water-miscible organic solvent may be present, but the amount may be small such as less than 10% or less than 5% by weight of the whole mixture. It may be the case that a biphasic mixture, and possibly each phase of a biphasic mixture contains at least 60%, at least 70% or indeed at least 80% by weight of water.

Numerous optional constituents may be included in an aqueous biphasic system. One possibility is fibers. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polyvinyl alcohol fibers and fibers made from polyesters of hydroxy acids such as polylactic acid and polyglycolic acid. When present in an aqueous biphasic mixture, the concentration of the fiber component in the overall mixture may be from about 1 to about 15 grams per litre, preferably from about 2 to about 12 grams per litre of liquid, and more preferably from about 2 to about 10 grams per litre.

It may be desired that the combined single phase which is formed underground in accordance with this invention will perform its intended function and then lose its viscosity. In such circumstances, the mixture may include a so-called 'breaker' to degrade any thickening material and thereby diminish the viscosity of the fluid after the need for such viscosity is past. Possible breakers include oxidizers, enzymes, and acids able to reduce a polymer's molecular weight. Preferred breakers include conventional oxidizers such as ammonium persulfates, live or encapsulated, or potassium periodate, calcium peroxide and chlorites.

Particulate solids may be carried by an aqueous biphasic mixture used in the invention but in order to be carried by a mobile biphasic mixture it may be desirable that such solid is of low-density. Low density particulate solids are mentioned in U.S. Pat. No. 4,733,729, which refers specifically to styrene-divinylbenzene copolymer (SDVB) beads obtained from The Dow Chemical Company and to ceramic spheres which are inert, low density beads typically containing a multiplicity of minute independent closed air or gas cells surrounded by a tough annealed or partially annealed outer shell as supplied commercially by 3M Company, under the trade name MACROLITE. Particulate solids may have and adhesive on their surface to adhere them together after they have been put in place.

Embodiments of the invention may also use other additives and chemicals. Additives commonly used in oilfield applications include breaker aids, oxygen scavengers, scale inhibitors, corrosion inhibitors, fluid-loss additives, bactericides and iron control agents. Such materials may simply be added to the mixture, or maybe added in an encapsulated form to protect them until needed, or to keep them out of contact with the surrounding solution for a time and then release them. Some examples of documents which describe encapsulation procedures are U.S. Pat. No. 4,986,354, WO 93/22537, and WO 03/106809.

An aqueous biphasic mixture may be prepared from individual materials at a well site or maybe prepared as a concentrate elsewhere, shipped to a well site and there diluted to the required composition without ceasing to be a two phase system.

Delivery of a mobile aqueous biphasic mixture to a subterranean location may be carried out in various ways including conventional methods used to place thickened fluids (although with expected savings in pumping energy). One possibility is that the mixture is simply pumped down a wellbore to a subterranean location. Where a wellbore encloses a production tube the aqueous biphasic mixture might be pumped down the production tube or down the annulus surrounding the production tube.

A further possibility is that the fluid is delivered by means of coiled tubing inserted into a wellbore. The term 'coiled tubing' is in widespread use to denote continuous tube which is drawn off from a storage reel and inserted temporarily into a wellbore for whatever distance is required. Because this tubing can be moved longitudinally within the bore, it can be used to place a fluid accurately at selected positions along the length/depth of a wellbore. These may be selected depths within a vertical wellbore and/or selected locations along a horizontal bore.

Developing this concept further, an aqueous biphasic system could be delivered through a jetting tool mounted at the end of coiled tubing. The fitting of jetting tools at the end of coiled tubing is shown in U.S. Pat. No. 5,765,642 and published US application 2007/0102156 (the latter contemplates use of such a tool to deliver a curable resin or aqueous silicate. An example of a hydrajetting tool which can be attached to coiled tubing is illustrated in Society of Petroleum Engineers Paper SPE 114881.

Conversion of a biphasic system into a combined single phase may be accomplished in a number of ways. One possibility is dilution with water or aqueous solution. When conversion is accomplished by dilution with aqueous solution supplied from the surface, that solution may contain crosslinking agent to crosslink the thickening material in the single phase and further enhance its viscosity. Another possibility for converting a biphasic mixture to a single phase is to increase the salinity of the composition.

A further possibility is to expose the aqueous biphasic system to increased temperature. This requires a second partitioning material which precipitates from solution when heated above a temperature referred to as its lower critical solution temperature (LCST) defined as the critical temperature at which the polymer solution undergoes phase separation from one phase (isotropic) to two phases (anisotropic) rich and poor in polymer. At temperatures below the LCST, the polymer is more hydrophilic and is dissolved due to hydrogen bonding with water. At temperatures above the LCST, the polymer is more hydrophobic and precipitates. When the polymer precipitates, it is effectively removed from the aqueous phase in which it was previously concentrated. This aqueous phase then combines with the other aqueous phase of the system hence forming a combined single phase. The precipitated polymer which was the second partitioning material now forms a separate phase but this is only a small part of the total volume and has little or no effect.

Conversion of such an aqueous biphasic system to form a combined single phase can be brought about by exposing the aqueous biphasic mixture to the natural subterranean temperature. The polymer which provides the second partitioning material should then be chosen such that its LCST is above ambient temperature at the surface but below the reservoir temperature at the subterranean location.

A number of polymers which may be used and their LCST values, are set out in the following table:

| Polymer or Co-polymer | LCST (° C.) in H2O |
| --- | --- |
| Poly(N-isopropylacrylamide) (abbreviated to poly(NIPAAm)) | 32 |
| Poly(82% NIPAAm:18% acrylamide) | 45 |
| Poly(N,N'-diethylacrylamide) | 26-35 |
| Poly(dimethylaminoethylmethacrylate) | 50 |
| Poly(N-(L)-(hydroxymethyl)propylmethacrylamide) | 30 |
| Poly(vinyl methyl ether) | 40 |
| Poly(ethylene glycol) | 120 |
| Poly (propylene glycol) | 50 |
| Poly(methacrylic acid) | 75 |
| Poly(vinyl alcohol) | 125 |
| Poly(vinyl methyl oxazolidone) | 65 |
| Poly(vinyl pyrrolidone) | 160 |
| Poly(silamine) | 37 |
| Methylcellulose | 80 |
| Hydroxypropylcellulose | 55 |
| Polyphosphazene derivatives | 33-100 |
| Poly(N-vinylcaprolactam) | 30 |
| Poly(siloxyethylene glycol) | 10-60 |

Any other process which has the effect of "removing" a secondary partitioning material from solution can be used to convert a biphasic mixture to a single phase. Thus chemical degradation of a second partitioning material, especially if it is a polyester which can be degraded by hydrolysis of ester linkages, is thus a further possibility for bringing about conversion to a viscous single phase. Precipitation of a second partitioning material is another possibility. Yet another possibility is adsorption of secondary partitioning material onto a solid which may be the geological formation at the subterranean location to which the mixture is delivered: this also has the effect of removing the secondary partitioning material from solution.

Yet another possibility is to expose the aqueous biphasic system to change in pH. We have observed that systems which incorporate a charged polymer do not readily phase separate. Consequently a biphasic system which incorporates an ionisable polymer in its uncharged form, either as second partitioning material or as a thickening polymer, can be converted to a single phase by changing the pH so that the polymer becomes charged.

Where conversion to a single phase is brought about by dilution with water supplied from the surface, two separate flow paths from the surface may be provided by production tubing and the surrounding annulus, or by coiled tubing and the space between the coiled tubing and the surrounding production tubing, or by coiled tubing and an additional tube enclosed within it.

Depending on the method used to convert the biphasic mixture to a more viscous single phase, conversion may take place at the subterranean location to which the composition is delivered, for example because a change in pH or dilution with water takes place there. However, it is also possible that conversion will take place as the composition approaches the location which is its intended destination, especially if conversion results from exposure to underground temperature.

The aqueous viscous fluid which is delivered to a subterranean location in accordance with this invention may serve any of a diverse variety of purposes in connection with production of oil or gas from a subterranean reservoir. Possible functions include, but are not limited to:

zonal isolation of one region from another,
blocking a path of flow, thus diverting the path of flow of another fluid which is pumped subsequently,
stabilisation of a weak formation,
hydraulic fracturing, including acid fracturing,
spacer fluids to separate two other fluids,
blocking inflow from a water-containing region,
blocking a path of fluid loss,
water flood, driving oil or gas towards a production well,
remediation fluids to remove unwanted deposits,
wellbore clean out, removing unwanted residues from previous operations.

A category of particular interest is those functions where the biphasic aqueous mixture is required to block water flow, because underground water can be utilised to dilute a biphasic mixture and convert it to a more viscous single phase.

Another category of particular interest is those functions where a very viscous gel is required, because this invention allows a biphasic mobile mixture to be pumped to a subterranean location and converted to a gel which is too viscous to pump. The invention may in particular be used in connection with the task of fracturing a formation (or possibly re-fracturing earlier fractures) at multiple locations along the length of a well. Viscous gel obtained by conversion of a biphasic mixture may be used to block some fractures temporarily while other fractures are being created (or re-fractured).

Embodiments of the invention will now be further described and illustrated by way of example only with reference to the following drawings and detailed description.

DETAILED DESCRIPTION AND EXAMPLES

Figure 1:
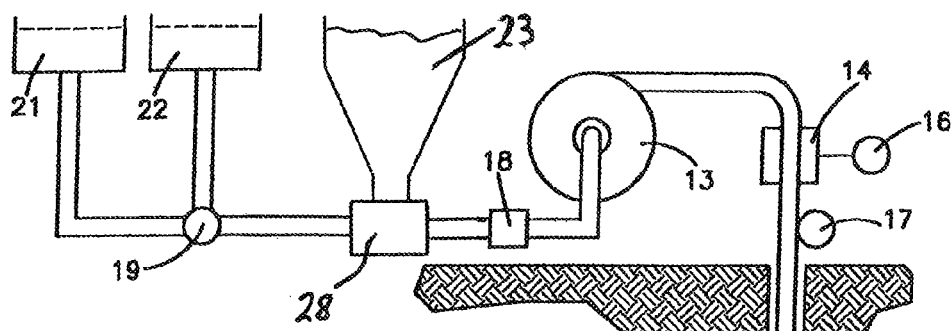
FIG. 1 diagrammatically illustrates delivery of a composition into a wellbore by means of coiled tubing.

FIG. 1 shows a treatment tool 10 connected to one end of coiled tubing 11 which functions to position the tool 10 at a desired location in a wellbore 12. The tube 11 also functions to supply fluid to the tool 10. The tubing 11 is stored as a coil on a reel 13 from which it is drawn off to the extent required. The tubing 11 passes from the drum 13 through powered grippers 14 which function to control the extension or retraction of the tube to raise and lower the tool 10 within the well 12. Connected to the grippers 14 is a weight measuring scale 16 which permits the operator to determine the weight of the tube 11 and the tool 10 being supported by the grippers 14 at any given time. A measuring device 17 engages the surface of the tubing 11 and provides the operator with an indication of the length of the string, and consequently an indication of the position of the tool within the well. The reel 13 and the grippers 14 are usually carried on a large road vehicle which is driven to the well site.

As shown by the detail view FIG. 1a, the vertical part of the well is lined with a steel casing 22 within which there is a production tube 24 with annulus 26 between the production tube and the casing. At the bottom of the production tube 24, within a vertical part of the well, the annulus is closed with a packer (not shown). In this instance the well deviates horizontally through an oil bearing zone of the reservoir.

Supplies of fluid 21, 22 and possibly also a supply 23 of thickening polymer in powder form are connected through metering valves 19 to a mixer 28. These supplies are used to make an aqueous biphasic mixture which is driven by pump 18 into the coiled tubing 11 and this conveys the fluid mixture down the wellbore 12 to the tool 10 which delivers it into the formation in the vicinity of this tool 10.

The biphasic system is converted to a single phase at a subterranean location. This may take place at the tool 10, although it could take place within the tubing 11 before the fluid reaches the tool 10 or could take place after the fluid has been delivered into the formation, depending on the method of conversion to a single phase. These possibilities will be further explained by reference to the following examples.

EXAMPLE 1

Guar and PEG8000

Figure 3:
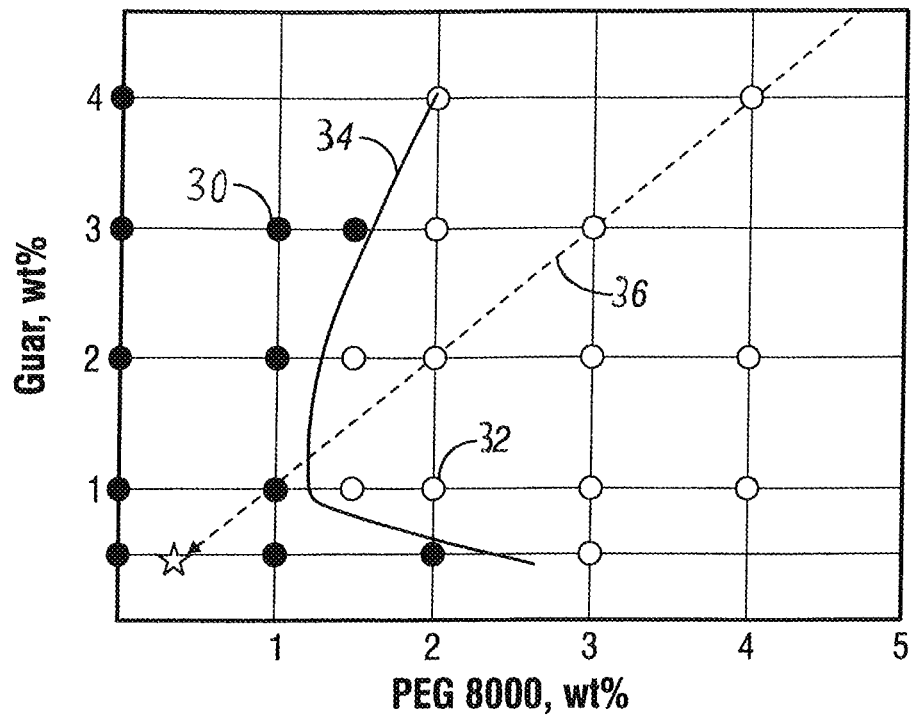
FIG. 3 is a phase diagram which illustrates an approximated binodal curve for the aqueous system of guar and polyethylene glycol having a molecular weight of 8000 (PEG 8000) in deionized water, wherein filled circles indicate single phase mixtures and open circles indicate two phase mixtures.

This example illustrates the formation of biphasic systems. Guar was used as the thickening agent and polyethylene glycol of mean molecular weight 8000 (PEG 8000) was used as the second partitioning material. A series of compositions was created by dissolving 0-4 weight percent (wt %) dry guar and 0-4 wt % dry PEG 8000 in deionized (DI) water. In each case, 200 ml of DI water were used, and the polymers were measured as dry powders with percentages expressed on a total fluid weight basis. For each sample, the dry polymers were mixed together and then added together into the DI water while stirring vigorously in a WARING blender. Each sample was stirred rapidly in the blender for a minimum of one hour. After this stirring process, each sample was inspected visually, poured into a measuring cylinder and allowed to stand for a period of at least 24 hours to check for phase separation. The results were plotted in FIG. 3 using filled circles 30 to indicate no phase separation and open circles 32 to indicate the occurrence of phase separation. The boundary between a single phase region of the diagram and a two phase region is demarcated by the binodal curve 34 approximated in FIG. 3.

Figure 4:
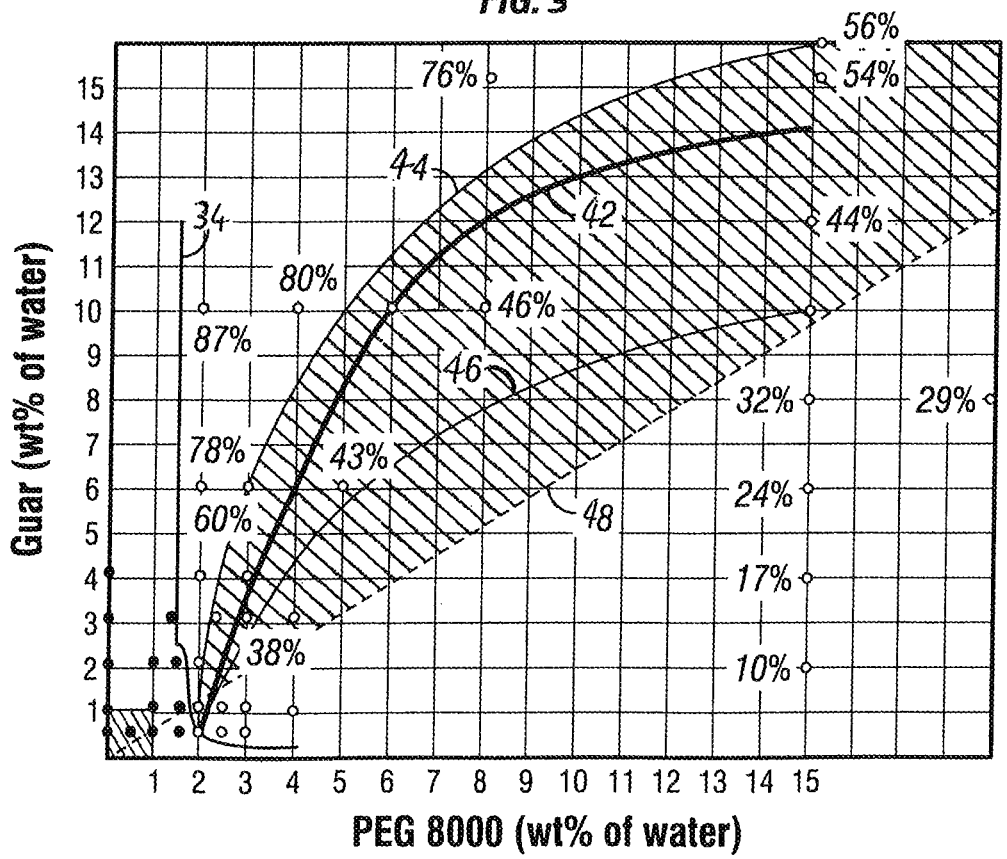
FIG. 4 is also a phase diagram for the aqueous system of guar and PEG 8000, extending to higher percentages of these materials, also showing the volume percentage of the guar-rich phase for the two phase mixtures, and showing a region of the phase diagram in which two phase mixtures are mobile.

This example was then extended to higher concentrations of guar and PEG8000, using 200 ml DI water each time. The results are shown in FIG. 4 and the percentages beside some of the points are the volume percent of the separated guar-rich phase at equilibrium. Line 42 in the two-phase region indicates the line of compositions having 50/50 phase volume ratio upon phase separation; line 44 indicates a 60/40 phase volume ratio of guar:PEG 8000; and line 46 indicates a 40/60 phase volume ratio of guar:PEG 8000. Compositions below-right with respect to the line 44 (60/40 guar:PEG 8000) were observed to exist as readily pourable water-in-water emulsions, whereas compositions above 60 to about 80 volume percent guar rich phase are borderline pumpable with visible thickening, generally resembling applesauce in texture. Compositions above 80 volume percent guar phase generally have a paste-like consistency. Thus compositions within the diagonally shaded area between the curve 44 and the dotted line 48 are able to form aqueous biphasic systems which are mobile and can be pumped to a subterranean location. The use of compositions outside the shaded area is not ruled out, but above and left of the curve 44 the compositions are increasingly viscous while below the line 28 the high content of PEG 8000 relative to guar imposes unnecessary cost.

These guar and PEG compositions can be converted to a viscous single phase by dilution. Thus as illustrated by the dashed line 36 in FIG. 3, a mobile biphasic system with 2 wt % guar and 2 wt % PEG 8000 can be diluted with water to form a single phase with 1 wt % of each polymer which will be more viscous than the biphasic mixture.

Figure 2:
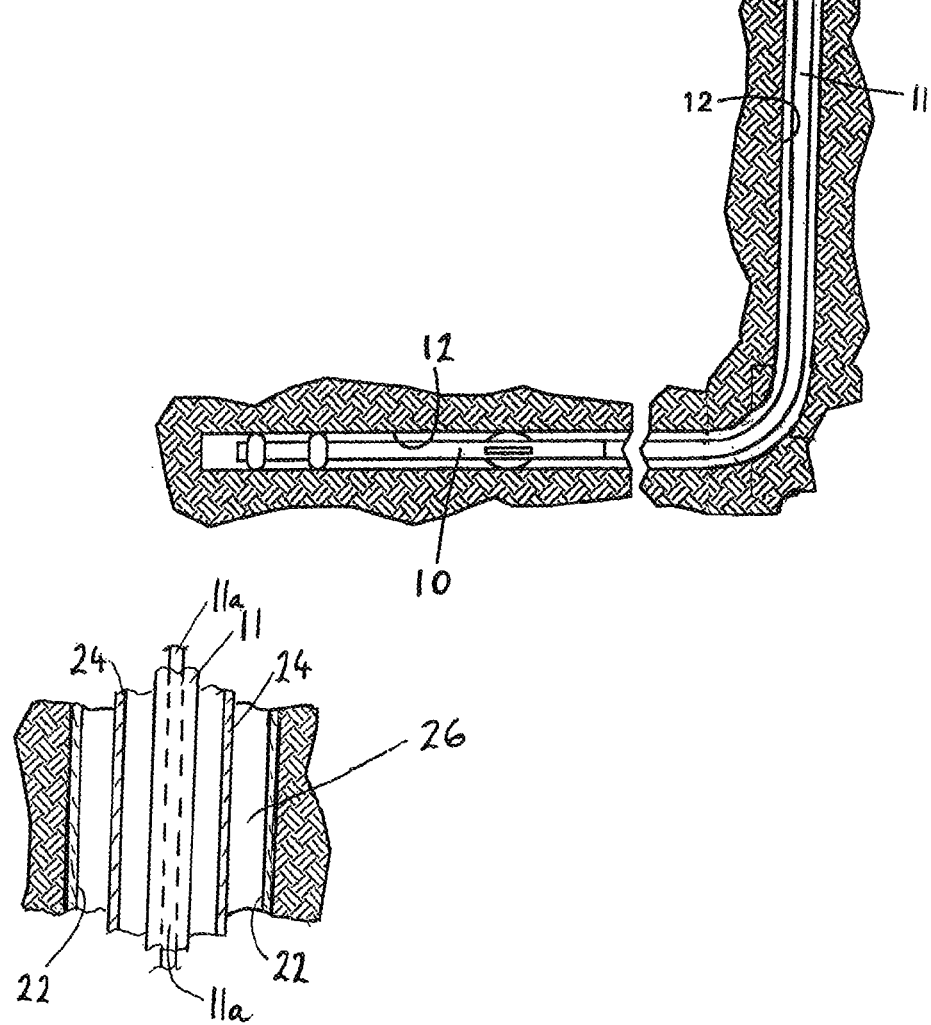
FIG. 2 is a detail of the vertical part of the well of FIG. 1.

To use this system in accordance with the present invention, the aqueous biphasic mixture with 2 wt % of guar and 2 wt % PEG could be made by mixing at the well site using the apparatus shown in FIG. 1 (or prepared elsewhere as an even more concentrated composition and diluted to 2 wt % of each polymer at the well site) then pumped downhole via the wellbore or via coiled tubing 11 in the wellbore as shown in FIG. 1, and diluted downhole to a viscous single phase. Dilution could be accomplished by mixing with water naturally present downhole, especially if the intention is to use the viscous single phase to block water-penetration. Alternatively, water for dilution could be pumped separately down the wellbore, outside the coiled tubing 11 or via a separate tube enclosed within the coiled tubing (indicated in broken lines as 11a in FIG. 2).

Conversion to a single phase by dilution could of course be carried out with other concentrations of polymers in the biphasic mixture. For example a composition with 1 wt % guar and 2 wt % PEG could be diluted to a more viscous single phase with 0.5 wt % guar and 1 wt % PEG.

EXAMPLE 2

Guar and HPC

The procedure of Example 1 was repeated using 0-4 wt % guar and 0-4 wt % hydroxypropyl cellulose (HPC) with mean molecular weight 100,000. The phase behaviour was generally similar to that observed in Example 1 with guar and PEG 8000.

Figure 5:
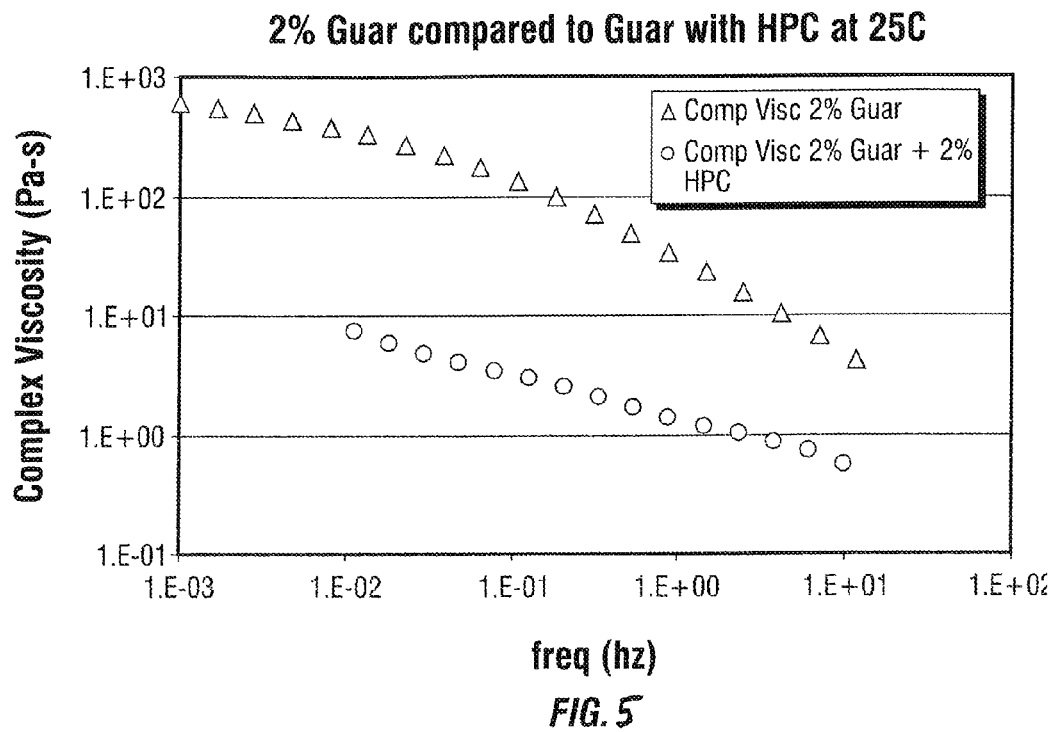
FIG. 5 is a graph of complex viscosity versus frequency for a 2 wt % guar gel and a fluid containing 2 wt % guar and 2 wt % hydroxypropyl guar (HPC) at 25° C.

A sample made with 2 wt % guar and 2 wt % HPC was shaken to return the mixture to a water-in water emulsion and the apparent viscosity of this emulsion was determined at various shear rates. The apparent viscosity of the single phase composition formed with 2 wt % guar but without HPC was also determined. The results with both samples are shown in FIG. 5 and it can be seen the viscosity values with HPC present (points depicted with open circles) were much lower than when it was absent. Indeed, without HPC the single phase composition was too viscous to pump if HPC was absent. The presence of HPC decreases the viscosity of the guar by approximately two-orders of magnitude, resulting in a pumpable fluid.

Figure 6:
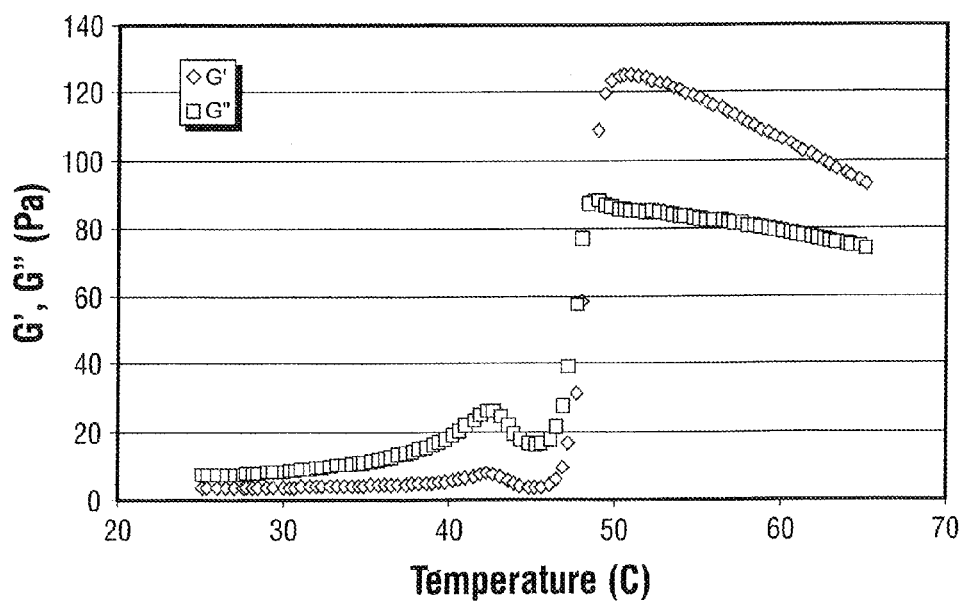
FIG. 6 is a graph of elastic modulus (G') and viscous modulus (G") versus temperature for a fluid containing 2 wt % guar and 2 wt % HPC.

A biphasic composition containing guar and HPC could be converted to a single phase composition by dilution, but another possibility is to bring about the conversion by exposure to increased temperature. The LCST of this HPC is about 45° C. A water-in water emulsion containing 2 wt % guar and 2 wt % HPC was exposed to increasing temperature. FIG. 6 shows the effect on the mixture rheology as the temperature is increased from 25° C. to 60° C. in the cup of a Bohlin rheometer over a 30 minute time period. The elastic and viscous moduli were monitored with a 10% strain oscillation at a frequency of 0.5 Hz. At lower temperatures, the solution behaves as a low viscosity fluid with the viscous modulus being greater than the elastic modulus. As the temperature exceeds the LCST for the HPC, the elastic modulus increased by nearly two orders of magnitude above its low temperature value. The HPC precipitated as a white solid and as the viscosity increased, the sample was observed to become a cloudy white, elastic gel.

Very similar results were obtained with a lower molecular weight HPC (mean molecular weight 10,000).

A biphasic composition in accordance with this example could be pumped down a wellbore to a subterranean location and converted to a single viscous phase by exposure to the reservoir temperature. A temperature above LCST might possibly be reached before the composition arrived at its intended subterranean destination, but nevertheless it is likely that most of the subterranean flow path will be traversed before the mixture reaches its LCST, so that conversion to a single phase would take place as the composition approached the intended destination even if it did not take place exactly on arrival at that destination.

EXAMPLE 3

Guar and Methylcellulose

Figure 7:
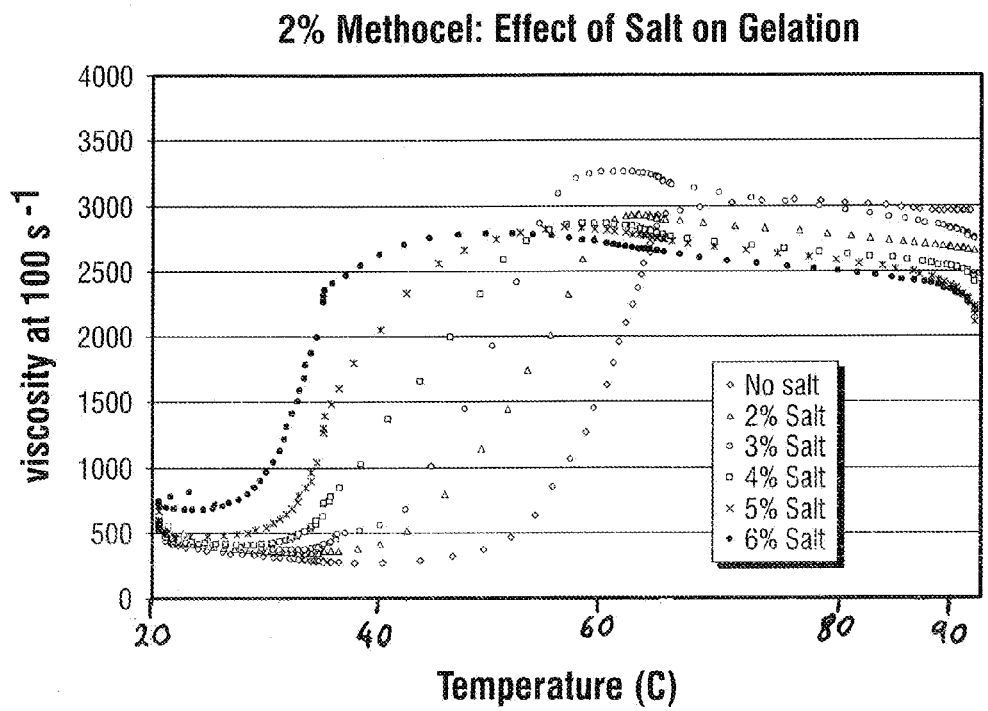
FIG. 7 is a graph of viscosity versus temperature for 2 wt % guar with 2 wt % methylcellulose and with increasing concentrations of added salt.

A biphasic fluid was formed, as in Example 1, using 2 wt % guar and 2 wt % methylcellulose (METHOCELL). This fluid was of low viscosity and easily pourable. Viscosity at 100 $sec^{-1}$ was monitored as temperature was increased from 20° C. to just over 90° C. with varying percentages of salt in the composition. The results are shown in FIG. 7. It can be seen from the results with no salt that the viscosity increased dramatically between 55 and 65° C. As the percentage of salt increased the temperature for this transition dropped and at 6 wt % salt content, the transition took place between 32 and 36° C.

It is apparent from these results that conversion to a single viscous phase could be brought about by exposure to increasing temperature, or by adding salt to the composition. Dilution would also bring about change to the viscous single phase state and so this composition could be brought into the viscous single phase state downhole by contact with brine present in the formation at a temperature above ambient.

EXAMPLE 4

Carboxy-substituted Guar and PEG: Use of a pH-trigger

We have observed that a uniformly charged polymer in DI water does not readily phase separate. Without being bound by theory, it is believed that this is because the charges on the polymer chain hinder the chain from coiling up in water to separate away from the second species. Phase separation with charged polymers can be achieved, however, by neutralizing these charges to make the polymer act like a neutral species.

Being anionic for "normal" conditions, carboxymethyl hydroxypropyl guar (CMHPG,) does not readily phase separate in DI water, even with the addition of PEG 8000 at concentrations that would cause phase separation with non-derivatized guar. However, a composition containing this ionisable polymer, with PEG as a second portioning material does phase separate if the pH of the solution is reduced to a pH less than about 3. At this pH range, the COO— groups on the CMHPG polymer are protonated to become COOH groups, thereby eliminating the anionic nature of the polymer and allowing phase separation to occur. When the pH of the phase-separated system is brought up above pH 3, however, the process is reversed and the two phase system becomes single phase with a concomitant change in viscosity. This was demonstrated as follows:

A 2 wt % aqueous solution of CMHPG solution in water at in at a pH of 2.7 was observed to be a viscous solution.

Figure 8:
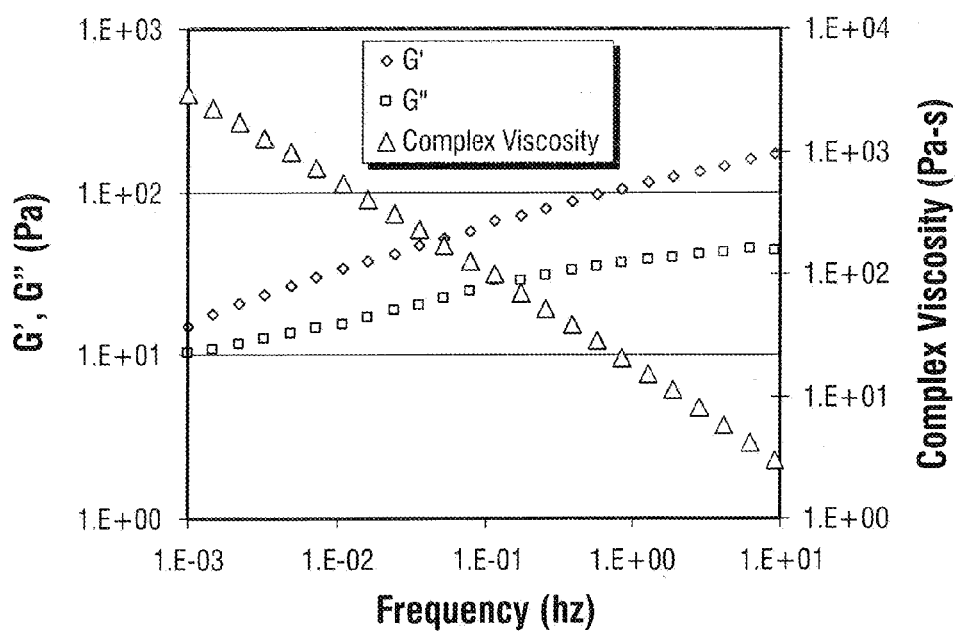
FIG. 8 is a graph showing elastic modulus (G') and viscous modulus (G") together with complex viscosity for a system containing 2 wt % carboxymethyl hydroxypropylguar (CPHMG) and 4 wt % PEG 8000 after conversion to a single phase by increase of pH.

A mixture containing 2 wt % CMHPG and 4 wt % PEG 8000 was prepared with a pH of approximately 2.7. At this low pH condition the system was biphasic with water-like viscosity, even though it contained 2 wt % guar polymer. Phase separation was verified by centrifuging the sample. The phase-separated sample after centrifugation was approximately 40% by volume "guar rich" phase and 60% by volume "PEG rich" phase. The sample was then re-mixed and potassium hydroxide was added to bring the pH up to 3.3, whereupon the system rapidly changed into a very viscous single .phase. The system was then brought up to a pH of approximately 10 by addition of more potassium hydroxide, and the rheology of the fluid was measured at 21° C. The rheology measurement (shown in FIG. 8) shows that the composition had become a highly viscous gel at this alkaline pH.

A viscous single phase fluid containing CMHPG can be provided below ground, in accordance with this invention, by formulating a biphasic mixture of CMHPG and PEG with a pH at or below 2.7 as in this example, pumping it down a wellbore and increasing the pH downhole to convert the biphasic mixture to a viscous single phase. The increase in pH could be brought about by addition of alkali, exposure to water in the reservoir if this has pH above about 3.5, or contact with a carbonate rock formation downhole.

EXAMPLE 5

Polyacrylamide and PEG

Aqueous fluids were made by dissolving partially hydrolysed polyacrylamide in water. This polyacrylamide has a molecular weight of approximately 5 million and is about 10% hydrolysed. The concentrations of polyacrylamide were 3%, 5% and 7% by weight. The pH of these fluids was approximately 6 million and they were viscoelastic. 4 wt % PEG 8000 was added to the fluids and a small amount of hydrochloric acid to decrease the pH below 3.5 The fluids became biphasic and mobile. Such biphasic fluids can be used in accordance with this invention and converted to a viscoelastic state by increasing the pH downhole.

EXAMPLE 6

Guar and Non-ionic Surfactant

A biphasic fluid was formed, as in Example 1, using 1.5 wt % guar and 3 wt % of the non-ionic surfactant polyoxyethylene (20) oleyl ether (BRIJ 98). This fluid was of low viscosity and easily pourable. Fluids were also formed using 1.5 wt % guar and either 1 wt % surfactant or none at all. These fluids were viscous single phase compositions. These observations of viscosity were confirmed by measuring viscosities at 100 sec−1 shear raste. Without surfactant or with 1 wt % of it, viscosity was 1 Pascal second but with 3 wt % surfactant it was 0.05 Pascal second.

This combination of materials can be used in this invention by preparing an aqueous biphasic fluid containing 4.5 wt % guar and 3 wt % polyoxyethylene (20) oleyl ether at the surface, pumping it downhole and diluting it underground with at least twice its own volume of water.

EXAMPLE 7

Polyacrylamide and Cationic Surfactant

An aqueous biphasic mixture was prepared using 0.2 wt % of polyacrylamide and 0.5 wt % of the cationic surfactant cetyltrimethyl ammonium chloride (CTAC). The composition was a stable water-in-water emulsion with a turbid appearance. Sample portions of this emulsion were placed in two jars. A piece of dry Klasach sandstone was placed in one jar. Both jars were then left to stand. The emulsion in contact with sandstone changed to a clear single phase while the control sample remained a turbid water-in-water emulsion.

This demonstrated the removal of one solute from solution by adsorption onto the rock surface, so that the two aqueous phases combine and form a single phase solution. In this instance it was the polyacrylamide which adsorbed, leaving a single phase solution of the surfactant.

It is apparent, in light of this Example, that a biphasic aqueous system can be formulated containing a thickening material and a secondary partitioning material chosen such that on delivery to a subterranean location the secondary partitioning material is removed from solution by adsorbtion onto the geological formation allowing the two phases to combine as a single phase thickened by the dissolved thickening material. For instance a system with viscoelastic surfactant as thickening material and polyacrylamide as secondary partitioning material would convert to a single phase thickened with viscoelastic surfactant on contact with sandstone which adsorbs the polyacrylamide. A system with guar as thickening material and polyacrylamide as secondary partitioning material would in analogous fashion convert to a single phase thickened with guar on contact with sandstone. A system with guar or polyacrylamide as thickening material and cationic surfactant as the secondary partitioning material would convert to a single phase thickened with the guar or polyacrylamide on contact with a carbonate rock which adsorbs cationic surfactant.

The invention claimed is:

1. A method of delivering a thickened aqueous composition to a subterranean location accessible via a wellbore, comprising steps of:
   i. providing a biphasic aqueous mixture comprising two aqueous solutions which, at surface temperature and pressure, are able to co-exist as separate aqueous phases in contact with each other, the two phases containing a plurality of dissolved solutes which segregate between the two phases such that at least one first solute is present at a greater concentration in the first aqueous phase than in the second aqueous phase while at least one second solute is present at a greater concentration in the second aqueous phase than in the first aqueous phase;
   ii. pumping said biphasic aqueous system down the wellbore to the subterranean location, and
   iii. converting the biphasic mixture below ground so that its phases combine into a single aqueous phase which is more viscous than the biphasic mixture.

2. The method of claim 1 wherein said at least one first solute is a thickening material which enhances viscosity of the combined single phase to a greater extent than said at least one second solute.

3. The method of claim 2 wherein said biphasic aqueous mixture forms a water-in-water emulsion in which the first phase with thickening material concentrated therein is the dispersed phase and the second phase with said at least one second solute concentrated therein is the continuous phase.

4. The method of claim 2 wherein the ratio by volume of said first and second phases lies in a range from 60:40 to 40:60.

5. The method of claim 2 wherein the ratio by weight of said at least one first solute to said at least one second solute lies in a range from 2:1 to 2:3.

6. The method of claim 2 wherein the thickening material comprises a polymer.

7. The method of claim 6 wherein said at least one second solute comprises a polymer or a surfactant.

8. The method of claim 2 wherein the thickening material is selected from guar, hydroxyalkyl guar where the alkyl group contains from 1 to 4 carbon atoms and carboxymethylhydroxyalkyl guar where the where the alkyl group contains from 1 to 4 carbon atoms, polyacrylamide. polymethacrylamide, hydrolysed polyacrylamide, hydrolysed polymethacrylamide and copolymers of polyacrylamide or polymethacrylamide.

9. The method of claim 2 wherein the aqueous biphasic mixture is converted to a single phase by precipitation or degradation of said second solute.

10. The method of claim 2 wherein the aqueous biphasic mixture is converted to a single phase by adsorption of said second solute underground.

11. The method of claim 1 wherein the aqueous biphasic mixture is pumped to the subterranean location through coiled tubing inserted within the wellbore.

12. The method of claim 1 wherein the aqueous biphasic mixture is converted to a single phase by dilution underground.

13. The method of claim 1 wherein the aqueous biphasic mixture is converted to a single phase by a change in pH underground.

14. The method of claim 1 wherein the aqueous biphasic mixture is converted to a single phase by exposure to heat underground.

15. The method of claim 1 wherein conversion to a single phase increases viscosity, measured at low shear rate of 10 $sec^{-1}$, by a factor of at least 10.

* * * * *